Patented May 15, 1951

2,553,405

UNITED STATES PATENT OFFICE 2,553,405

PREPARATION OF BENZONITRILES

James K. Dixon, Riverside, Conn., assignor to American Cyanamid Company, New York, N. Y., a corporation of Maine No Drawing. Application April 8, 1950, Serial No. 154,869

3 Claims. (Cl. 260—465)

The present invention relates to the preparation of benzonitriles.

It is an object of the invention to react a cyanogen halide such as cyanogen chloride or cyanogen bromide with benzene or a halobenzene to prepare the corresponding benzonitrile. It is a further object to react benzen or a halobenzene with a cyanogen halide at elevated temperatures in the vapor phase. Additional objects will be apparent from the discussion hereinafter.

The reaction is preferably carried out at an average reaction tube temperature of at least 600° C. and still more preferably at an average temperature within the range 650°–700° C. Temperatures as high as 800° C. and even higher may be used but the yields are greatly reduced. In most cases optimum yields will be obtained at an average temperature of about 675° C. In carrying out the reaction the vaporized reactants should be forced through the hot reaction tube at a velocity sufficiently slow to permit reaction but not so slowly that the materials have an opportunity to decompose. A residence time of at least about ½ second at reaction temperature is necessary, and a residence time of 5–15 seconds is preferred.

The ratio of reactants is not critical and some benzonitrile will be formed even though the mol ratio of the reactants varies from 0.1 to 10. However, as the cyanogen halide is generally more expensive than benzene, it is economically preferable to use the benzene in molar excess.

The reaction is preferably conducted at atmospheric pressure but superatmospheric pressures may be used if desired.

The following examples illustrate without limiting the invention.

Example 1

Benzene vapor (3.64 mols) and cyanogen chloride vapor (1.45 mols) were passed into a Pyrex tube heated in an electric furnace. The reaction tube was maintained at an average temperature of 659° C. and the contact time was 5.3 seconds. The resulting vapor mixture was condensed in a receiver maintained at a temperature of 85° C., which was sufficiently hot to condense benzene and benzonitrile, while keeping by-product hydrogen chloride and unreacted cyanogen chloride in the vapor phase. The latter gases were drawn off from the top of the receiver through an alkaline trap which was vented to the atmosphere. The crude benzonitrile together with unreacted benzene was passed into a fractionating column where the benzene was stripped out and recovered for recycling and crude benzonitrile was taken off at the bottom of the column for refractionation. In one pass the conversion of cyanogen chloride to benzonitrile was 9.7%.

Several modifications will be immediately apparent to one skilled in the art. It will not be necessary to use a tube of Pyrex but any reaction tube resistant to the relatively high temperatures of the reaction will be suitable including nickel, quartz, the alloy known as Inconel, and the like. Furthermore, instead of using a hot receiver to keep hydrogen chloride and cyanogen chloride in the vapor phase, if desired, all of the gaseous products can be condensed, followed by distillation to recover the nitrile product, or, if desired, the reaction liquor washed in alkali to remove dissolved hydrogen chloride and cyanogen chloride, followed by fractionation to recover the unreacted hydrocarbon and the nitrile.

While the above example deals with cyanogen chloride, cyanogen bromide can be used equally well.

Example 2

Using a procedure analogous to that of the preceding example, 1.73 mols of chlorobenzene was reacted with 0.83 mol of cyanogen chloride at an average reaction tube temperature of 656° C. for a contact time of 12.5 seconds to yield 0.08 mol of m-chlorobenzonitrile and 0.04 mol of p-chlorobenzonitrile, amounting to conversions of input cyanogen chloride of respectively 9.6% and 4.8%.

Other halobenzenes can be used in analogous reactions to yield other halobenzonitriles.

While the invention has been described with particular reference to specific embodiments, it is to be understood that it is not to be limited thereto but is to be construed broadly and restricted solely by the scope of the appended claims.

I claim:

1. The method of preparing a benzonitrile that comprises heating a member of the group consisting of benzene and a halobenzene with a cyanogen halide of the group consisting of cyanogen chloride and cyanogen bromide at a temperature of at least about 600° C., and recovering the thus-formed benzonitrile.

2. The method according to claim 1 in which the reaction is carried out at a temperature within the range 650°–700° C., using cyanogen chloride.

3. The method according to claim 2 in which the cyanogen chloride is in a molar deficiency.

JAMES K. DIXON.

REFERENCES CITED

The following references are of record in the file of this patent:

UNITED STATES PATENTS

| Number | Name | Date |
| --- | --- | --- |
| 2,449,643 | Cosby | Sept. 21, 1948 |

OTHER REFERENCES

Merz et al., Beilstein (Handbuch 4th ed., 2nd sup.) vol. 3, p. 19 (1929).

Thompson, Chem. Abstracts, vol. 35, p. 7270 (1941).